United States Patent
Rapoport et al.

(10) Patent No.: US 9,043,827 B1
(45) Date of Patent: May 26, 2015

(54) METHOD AND SYSTEM FOR PROVIDING CONDITIONAL ACCESS TO ENCRYPTED CONTENT

(75) Inventors: Maxim Rapoport, Bensalem, PA (US); Charles A. Eldering, Furlong, PA (US)

(73) Assignee: PRIME RESEARCH ALLIANCE E, INC. (VG)

( * ) Notice: Subject to any disclaimer, the term of this patent is extended or adjusted under 35 U.S.C. 154(b) by 1003 days.

(21) Appl. No.: 12/639,460

(22) Filed: Dec. 16, 2009

(51) Int. Cl.
| | |
|---|---|
| H04N 7/167 | (2011.01) |
| H04N 7/173 | (2011.01) |
| H04L 9/08 | (2006.01) |
| H04N 7/16 | (2011.01) |
| H04N 21/2347 | (2011.01) |
| H04L 9/06 | (2006.01) |
| H04N 21/472 | (2011.01) |
| H04N 21/45 | (2011.01) |
| G06F 21/10 | (2013.01) |
| H04L 29/06 | (2006.01) |
| G06F 21/31 | (2013.01) |

(52) U.S. Cl.
CPC ......... *H04N 7/1675* (2013.01); *H04N 7/17318* (2013.01); *H04L 9/08* (2013.01); *H04N 7/163* (2013.01); *H04N 21/23476* (2013.01); *H04L 9/06* (2013.01); *H04N 21/47202* (2013.01); *H04N 21/4532* (2013.01); *G06F 21/10* (2013.01); *H04L 63/08* (2013.01); *G06F 21/31* (2013.01)

(58) Field of Classification Search
USPC .......... 725/31, 25; 380/210, 211, 42, 45, 277; 705/51
See application file for complete search history.

(56) References Cited

U.S. PATENT DOCUMENTS

| | | | |
|---|---|---|---|
| 4,864,615 | A | 9/1989 | Bennett et al. |
| 4,991,208 | A | 2/1991 | Walker et al. |
| 5,768,388 | A | 6/1998 | Goldwasser et al. |
| 7,023,992 | B1 * | 4/2006 | Kubota et al. ................. 380/210 |
| 7,043,021 | B2 | 5/2006 | Graunke et al. |
| 7,505,592 | B2 * | 3/2009 | Russ et al. ..................... 380/234 |
| 7,590,860 | B2 * | 9/2009 | Leporini et al. .............. 713/185 |
| 2002/0129375 | A1 | 9/2002 | Kim et al. |
| 2002/0170053 | A1 * | 11/2002 | Peterka et al. .................. 725/31 |
| 2003/0051250 | A1 | 3/2003 | Sugimoto et al. |
| 2003/0051251 | A1 | 3/2003 | Sugimoto et al. |
| 2006/0107285 | A1 * | 5/2006 | Medvinsky ..................... 725/25 |
| 2006/0143668 | A1 * | 6/2006 | Du Breuil ....................... 725/89 |
| 2008/0019516 | A1 | 1/2008 | Fransdonk |
| 2008/0034276 | A1 | 2/2008 | Ficco |
| 2008/0040742 | A1 | 2/2008 | Howcroft et al. |
| 2008/0066095 | A1 * | 3/2008 | Reinoso ......................... 725/28 |
| 2010/0312861 | A1 * | 12/2010 | Kolhi et al. .................... 709/219 |

FOREIGN PATENT DOCUMENTS

WO     WO 02/52852     4/2002

\* cited by examiner

*Primary Examiner* — Jun Fei Zhong
(74) *Attorney, Agent, or Firm* — The Belles Group P.C.

(57) ABSTRACT

A method and system of providing conditional access to encrypted content includes receiving unsolicited multiply encrypted video content and first decryption data over a broadcast network. Partially decrypted video content is obtained by decrypting a first layer of encryption of the encrypted video content using the first decryption data. The partially decrypted video content is stored. A request for viewing the encrypted video content is transmitted and second decryption data is received. A second layer of encryption of the encrypted video content is decrypted using the second decryption data.

20 Claims, 13 Drawing Sheets

METHOD AND SYSTEM FOR PROVIDING CONDITIONAL ACCESS TO ENCRYPTED CONTENT

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1A:
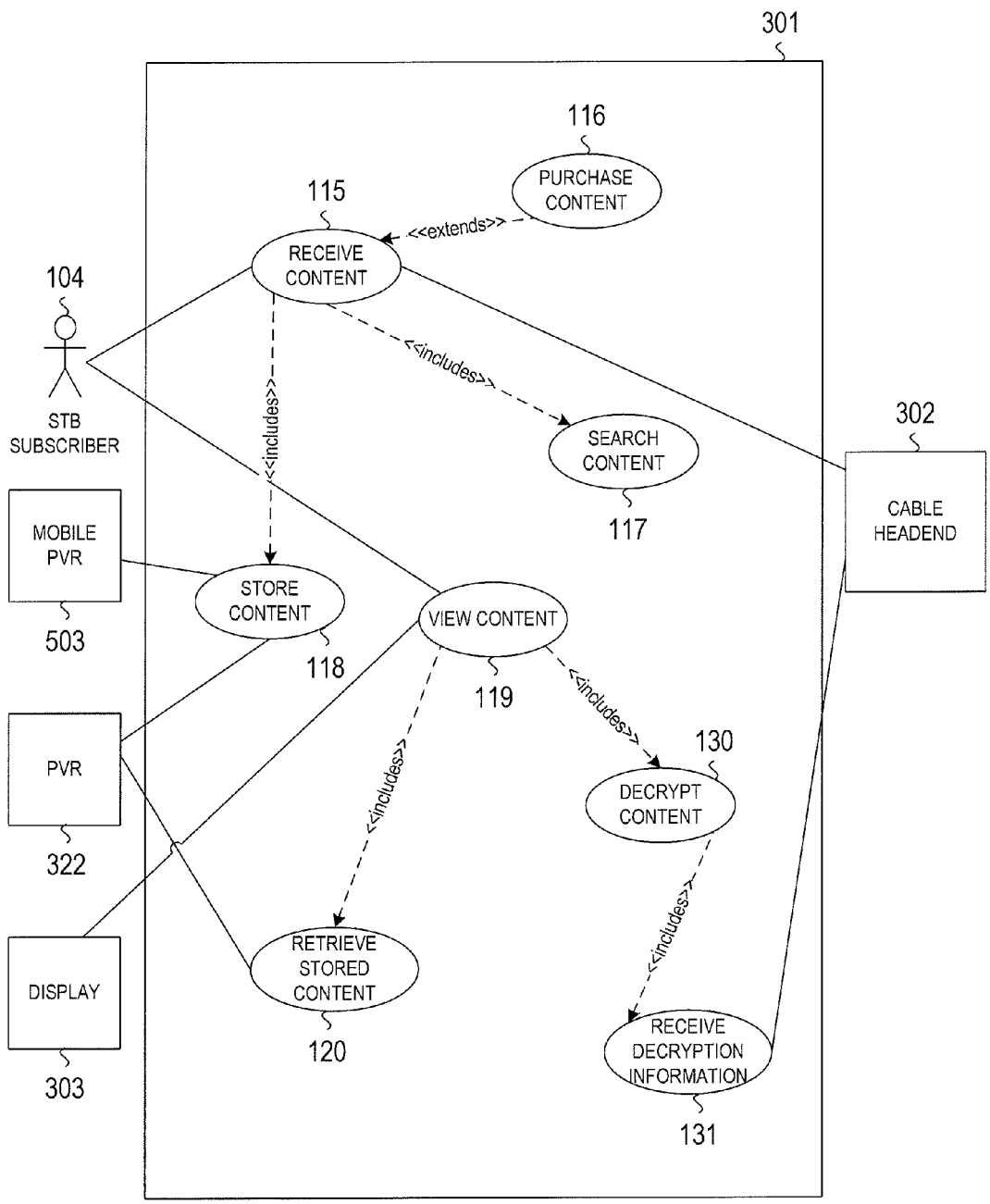
FIG. 1a is a use case diagram for a set top box (STB) in accordance with one embodiment of the content delivery system of the present disclosure.

Certain terminology is used herein for convenience only and is not to be taken as a limitation on the embodiments of the present disclosure. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the figures and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present disclosure, but do not constrain implementation thereof to any particular hardware or software embodiments.

Embodiments of the present disclosure concern the use of personal video recorders (PVRs) to pre-record video data in encrypted form, and play it back at a later time when the corresponding decryption key becomes available. The use of the term PVR herein is not limited to a standalone dedicated device. Rather, PVR refers to devices capable of tuning, recording and storing live television broadcasts in a digital form with an ability to subsequently play back the stored data. Accordingly, the term PVR includes, but is not limited to: devices integrated into television sets, devices integrated into set top boxes (STB), stand-alone dedicated devices, and specially adopted personal computers. In one embodiment, cable providers can utilize bandwidth in off-peak hours to pre-load video that is not yet available for general public view. Embodiments of the present disclosure are also applicable to mobile PVRs. Some embodiments of the present disclosure relate to pre-loading encrypted content on mobile PVR over a land-line and delivering the decryption information wirelessly. The use of the term mobile PVR herein is not limited to a dedicated mobile device for recording and playing video. Rather, the term mobile PVR is used herein to mean all mobile devices capable of recording, storing and reproducing video. The term mobile PVR includes, but is not limited to, standard standalone dedicated mobile video recording devices; smart phones with video capability, and mobile laptop computers.

In one or more embodiments of the method and system, content is preloaded onto a receiving device in an encrypted format such that the user cannot access the content until so authorized by a digital rights controlling entity. Content can be selected for preloading based on the user's current selections for items to be recorded, previous selections, general viewing habits, and recommendations. In an alternate embodiment, content is preloaded based on the anticipated demand for that content.

In one embodiment the content preloading is accomplished by performing a double encryption. The content is encrypted once by methods well known to those skilled in the cable television arts, e.g. Entitlement Control Message/Entitlement Management Message (ECM/EMM) encryption. Subsequently, the content is encrypted again using the same method but using a different key. The content and the first accompanying decryption information are sent to a STB. The content can be sent in response to the user's request or without user's knowledge. A STB receives the encrypted content along with the first decryption key. The content is decrypted immediately upon receipt and stored on a PVR. However, since the second layer of encryption has not been removed, the content cannot be immediately viewed. Later, when the content becomes available, the user can request the viewing. In one embodiment, the user is aware that the content was pre-recorded and requests the viewing by interfacing with the PVR. In another embodiment, the user is unaware that the content was recorded and requests the content through typical on-demand ordering means. Once the viewing of the content is requested the second decryption key is delivered to the STB. The STB decrypts the content stored on the PVR and outputs the content for viewing. This embodiment allows the use of a standard STB with little or no modifications. Additionally, this embodiment does not require the storage of encrypted information and decryption key at the same time on user equipment, which is desirable in order inhibit unauthorized access to the content.

In another embodiment the content is encrypted only once. The content is sent to the user's STB along with first part of decryption information, e.g. ECM. The content can be sent by user request or automatically. The content and the first part of the decryption information are stored on the PVR. Since the second part of the decryption is not available to the user, the content cannot be immediately viewed. Later, when the content becomes available, the user can request the viewing. Once the viewing of the content is requested the second part of the decryption information, e.g. EMM, is delivered to the STB. The STB uses both parts of the decryption information to decrypt the content and output it for viewing. This embodiment is less computationally intensive and requires only a single encryption and decryption.

In another embodiment the user can request a pre-loading of content to a mobile PVR before the content is available for viewing. Later the user can wirelessly receive the decryption key for the content as soon as it becomes available for viewing. This allows the user to watch the newest content in high resolution as soon as it become available, even when there is not enough available bandwidth to stream the content. For example, this embodiment can be used to pre-load a new episode of a TV show that was not broadcasted. Later when the show starts being broadcasted on TV, the user can receive a decryption key via a wireless network, and can watch the new TV episode on his mobile PVR concurrently with the broadcast. In this embodiment, the encrypted content is received and stored on the user's mobile PVR via a high speed connection, e.g. TV cable. The content however cannot be viewed immediately, since no decryption information is available. Later, when the content becomes available, the user can request the viewing via a low-speed connection, e.g. a wireless network. The decryption key is then delivered wirelessly to the mobile PVR. The PVR the uses the decryption information to decrypt and display the content.

Referring now to the drawings in detail, wherein like numerals indicate like elements throughout, there are shown in FIGS. 1-9 several embodiments of the present disclosure, depicting a content delivery system for providing conditional access to encrypted content. The content delivery system of the present disclosure pre-loads video content and subsequently delivers at least some of the corresponding decryption information.

Figure 7:
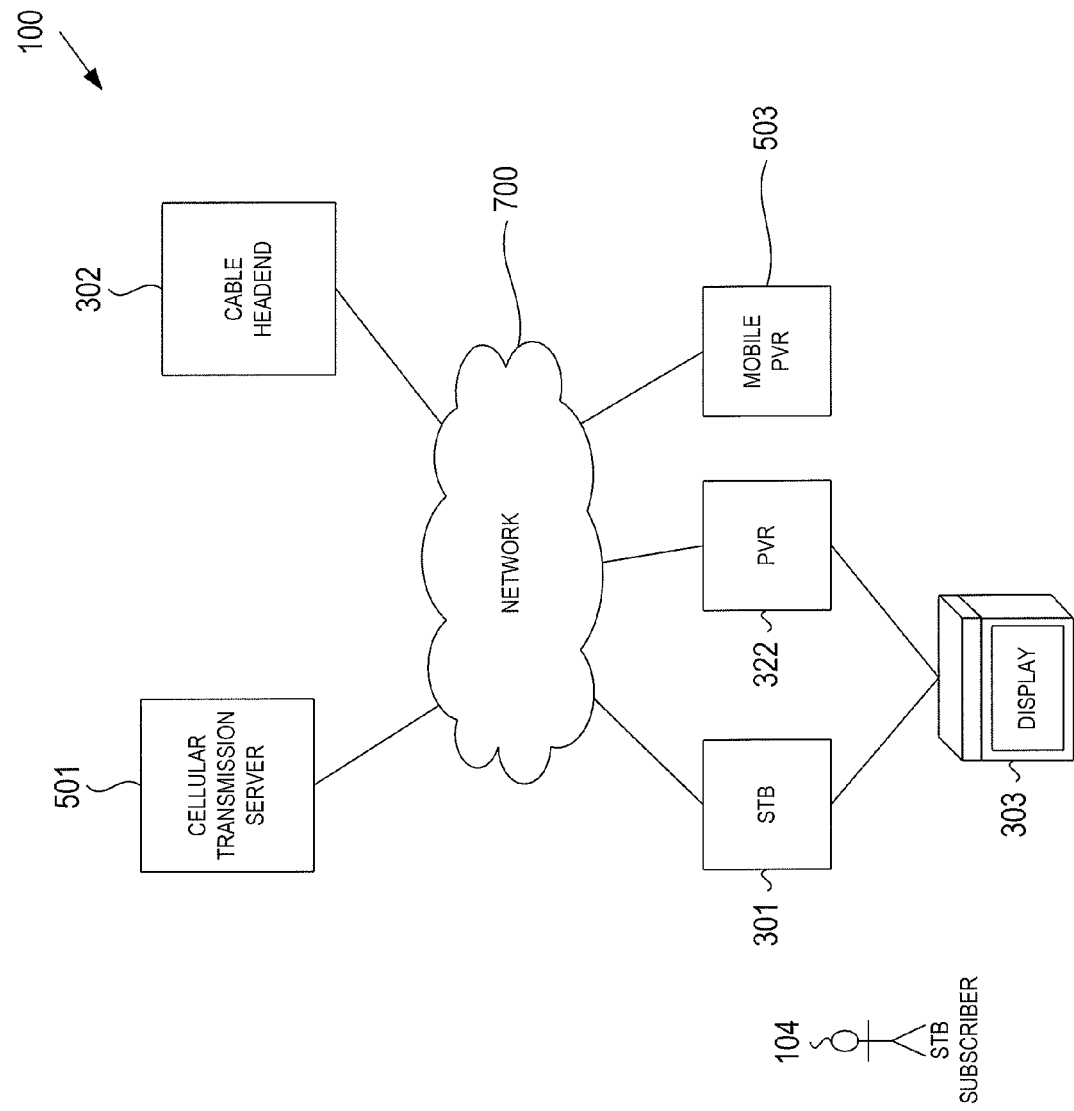
FIG. 7 is a system diagram of a content delivery system according to one embodiment of the present disclosure.

FIG. 7 is a system diagram of the content delivery system (CDS) 100 that allows content preloading from the cable headend 302 to the STB subscriber's equipment. The STB subscriber 104 may utilize the STB 301 or the PVR 322 to access the content from the cable headend 302. The STB 301 and the PVR 322 may connect to the cable headend over the network 700. The STB 301 and the PVR 322 are each capable of displaying the content on a display 303. STB subscribers 104 may also utilize the mobile PVR 503 to access the content from the headend 302. The mobile PVR 503 may connect to the cable headend over the network 700. The mobile PVR 503 may also receive decryption information and content from the cellular transmission server 501 which may be connected to the network 700.

FIG. 1a is a use-case diagram for the STB 301 of the CDS 100 (see FIG. 7). Within an exemplary diagram of the CDS 100 included is a set of external actors for interacting with the STB 301, including a STB subscriber 104, mobile PVR 503, PVR 322, display 303 and cable headend 302. The use of the term Set Top Box (STB) herein is not limited to a standalone dedicated device for providing digital Cable TV service. Rather, STB is used herein to mean all devices capable that includes a tuner and audio visual output functions for digital television reception and output capability. The term STB includes, but is not limited to, standard standalone dedicated devices, devices incorporated into televisions, CableCard ready devices, and specially adopted personal computers. Consequently, the use of the term STB subscriber is not limited to a person subscribing to services which include a standalone dedicated device. Rather, the term STB subscriber is used herein to mean all subscribers to digital TV services using equipment capable of tuning, and outputting digital video content.

The STB subscriber 104 uses the content delivery system 100 by interacting with a STB 301. In one embodiment, the STB subscriber 104 interacts with the content delivery system 100 using a familiar VOD interface, known to those skilled in the art of digital television.

The STB 301 includes a receive content use case 115 to allow the STB subscriber 104 to access content. In one embodiment the STB 301 uses the receive content use case 115 to receive content "pushed" from the headend 302. In another embodiment, the STB 301 uses the receive content use case 115 to receive content selected by the STB subscriber 104. In one embodiment, the receive content use case 115 is extended by the purchase content use case 116, where the STB subscriber 104 can provide payment for selecting certain content. The receive content use case 115 includes a search content use case 117 that allows the STB subscriber to identify needed content using a standard set of criteria, such as type of content, genre, and price.

The receive content use case 115 includes a store content use case 118. The store content use case 118 allows the STB 301 to record the content to a storage device such as a personal video recorder 322 or mobile PVR 503.

A view content use case 119 allows the STB subscriber 104 to playback content on the display 303. The view content use case 119 includes a retrieve stored content use case 120 that is used by the STB 301 to retrieve content that was previously stored on a PVR 322. The view content use case 119 also includes a decrypt content use case 130 to transform any of the retrieved content that was encrypted into decrypted content. The decrypt content use case 130 includes a receive decryption information use case 131 to acquire encryption keys from the headend 302 necessary to decrypt the content.

Figure 1B:
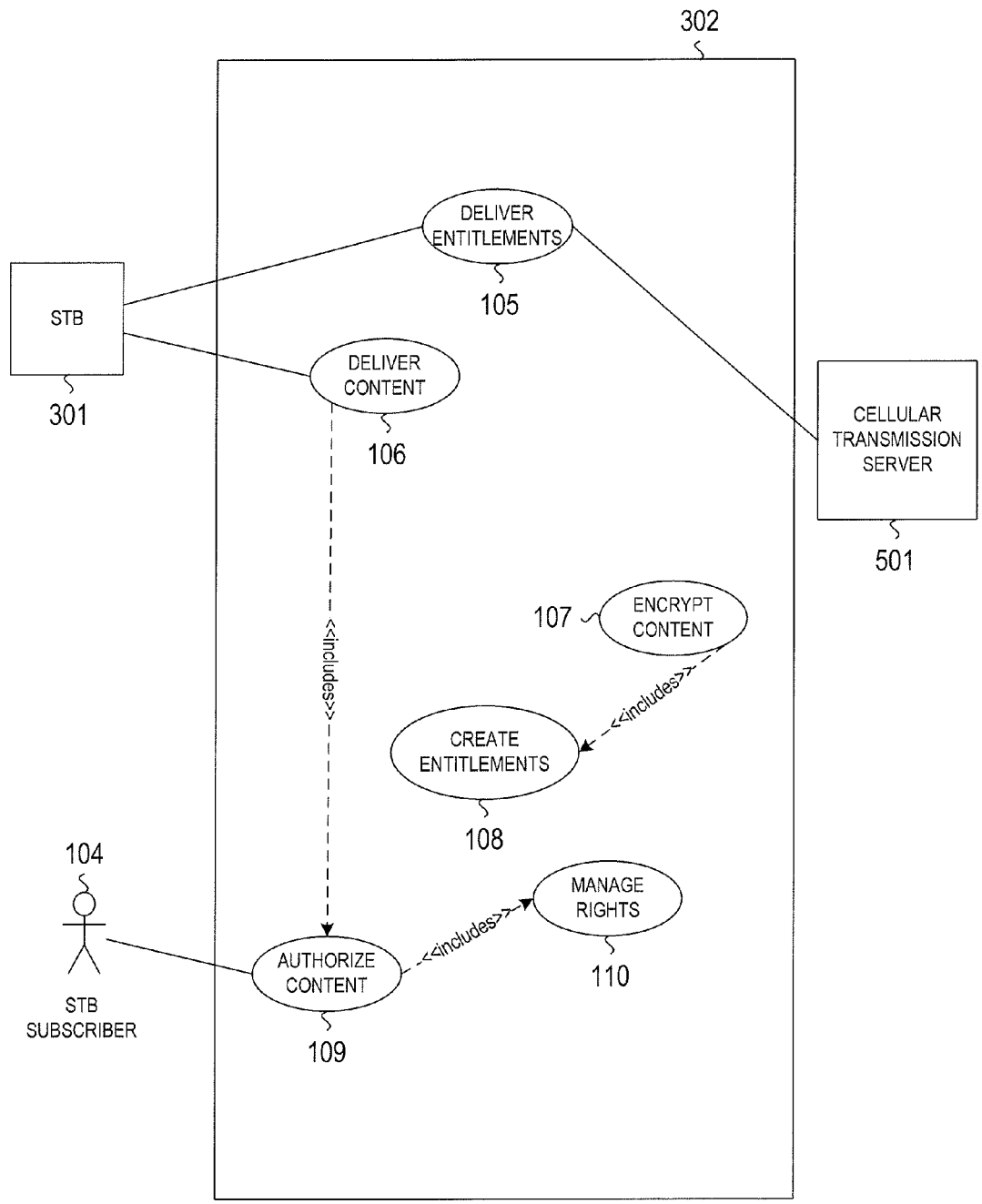
FIG. 1b is a use case diagram for a cable headend in accordance with one embodiment of the content delivery system of the present disclosure.

FIG. 1b is a use-case diagram of the cable headend 302 of the CDS 100. The cable headend 302 allows the cable provider to provide the STB 301 with encrypted content and corresponding decryption keys. Use of the term cable provider is not limited to a cable TV provider using primarily RF infrastructure, but rather the term also includes other TV and multimedia service providers.

The encrypt content use case 107 enables the cable headend 302 to perform content encryption on acquired content. The manners in which the cable headend 302 acquires content are well known in the art and include but are not limited to retrieving content from an external content database. The encryption methods include RSA, DES or any other encryption method well understood by one skilled in the art. In one embodiment, the encrypt content use case 107 can be invoked multiple times resulting in two different set of keys (see, e.g., FIG. 2a). The encrypt content use case 107 creates encrypted content and includes the create entitlements use case 108 to create the entitlements corresponding to the encrypted content. In one embodiment the entitlements comprise an ECM/EMM pair. The process of creating the encrypted content and corresponding ECM/EMM is well known by those skilled in cable television arts.

The encrypted content created by the encrypt content use case 107 is utilized by the deliver content use case 106. The deliver content use case 106 allows the cable headend 302 to deliver the encrypted content to the STB 301. In one embodiment, the deliver content use case 106 delivers content to the STB 301 without the STB user's knowledge. For example, the deliver content use case 106 can be used to deliver new-release movies that are in high demand, but before the movies are available for viewing.

The deliver content use case 106 includes authorize content use case 109. Authorize content use case 109 allows the cable headend 302 to administer viewing rights of the STB subscriber 104, and select appropriate content to be pushed to the user. The authorize content use case 109 includes manage rights use case 110 that enables the cable headend 302 to authorize the STB subscriber 104 to view certain content. The manage rights use case 110 can utilize information about the STB subscriber 104, such as which subscription plan a particular STB subscriber 104 has rights to, or whether the STB subscriber 104 has purchased content to acquire rights to certain content.

In one embodiment when the STB subscriber 104 views the content, the deliver entitlements use case 105 is used to deliver the entitlements (e.g., ECM/EMM) created by the encrypt content use case 107 to the STB 301. In another embodiment, the deliver entitlements use case 105 is initiated at a predetermined time. In one embodiment, the deliver entitlements use case 105 is used to enable the STB subscriber 104 to view content that was preloaded.

In another embodiment the deliver entitlements use case 105 enables the cable headend 302 to deliver decryption information to the mobile PVR 503 (not shown in FIG. 1b). In one embodiment, the entitlements are first delivered to the cellular transmission server 501, which can then deliver the entitlements to the mobile PVR 503. In this embodiment, the deliver entitlements use case 105 is initiated when the STB subscriber 104 views the content on the mobile PVR 503 or at a predetermined time.

Figure 1C:
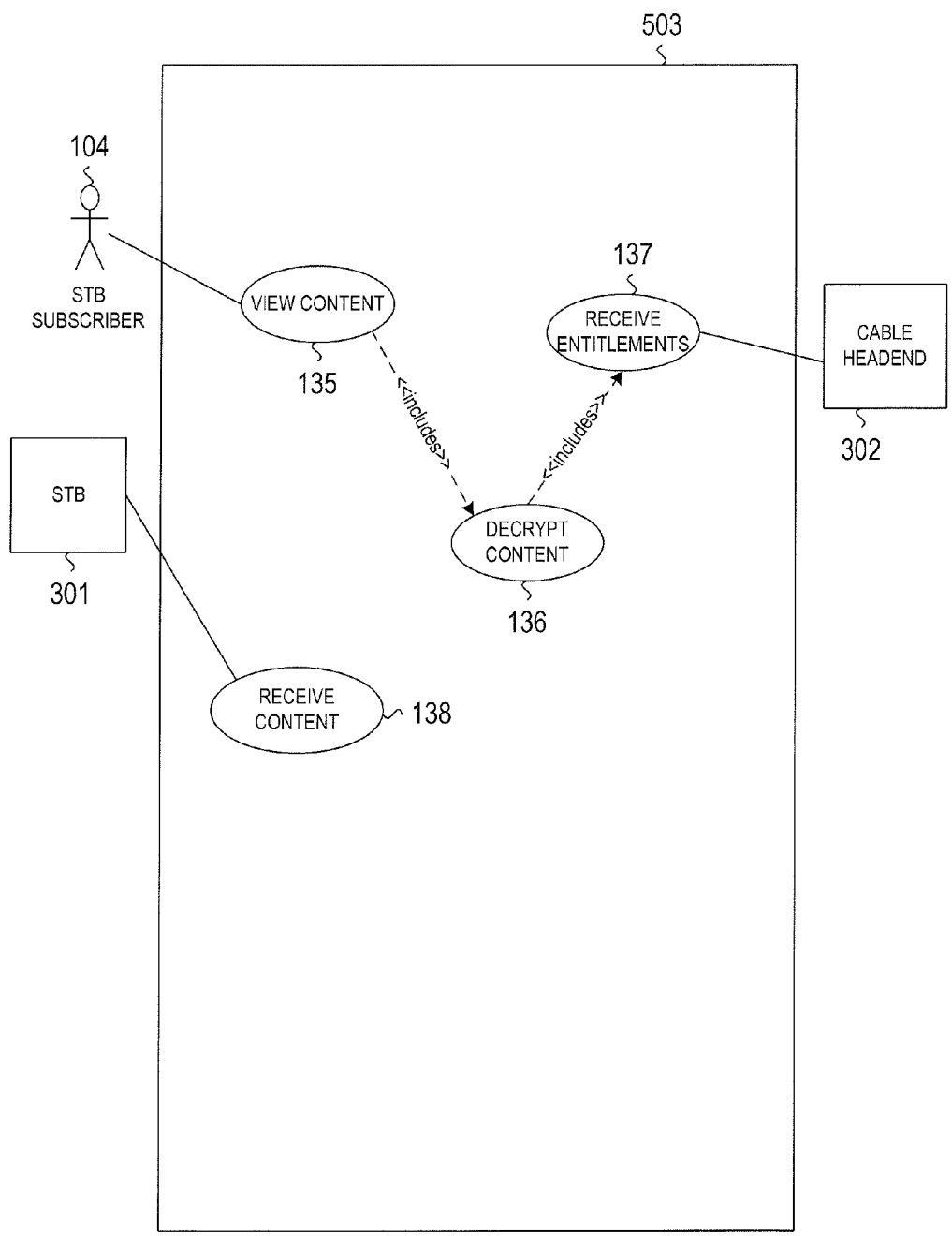
FIG. 1c is a use case diagram for a mobile personal video recorder in accordance with one embodiment of the content delivery system of the present disclosure.

FIG. 1c is a use-case diagram for the mobile PVR 503 of the CDS 100. In one embodiment, the STB subscriber 104 can connect the mobile PVR 503 to the STB 301. The receive content use case 138 allows the mobile PVR 503 to store the encrypted content that is received from the STB 301. Subsequently, the STB subscriber 104 can disconnect the mobile PVR 503 from the STB 301.

The view content use case 135 allows the mobile PVR 503 to playback the content on the mobile PVR 503. The view content use case 135 includes the decrypt content use case 136 that derives the decrypted content using the stored encrypted content and received entitlements. The decrypt content use case 136 includes receive entitlements use case 137 that is used by the mobile PVR 503 to receive the entitlements from the cable headend 302 wirelessly via the cellular transmission server 501.

In various embodiments of the present method and system the cable headend 302 may preload certain content on the subscriber's STB 301 in encrypted form during off-peak viewing times, where the preloaded content is not yet released for viewing. When the content becomes available to the public, the STB subscriber 104 requesting the content receives the entitlements, enabling the STB subscriber to view the already pre-loaded content, thereby alleviating the bandwidth load at peak viewing times.

Figure 3:
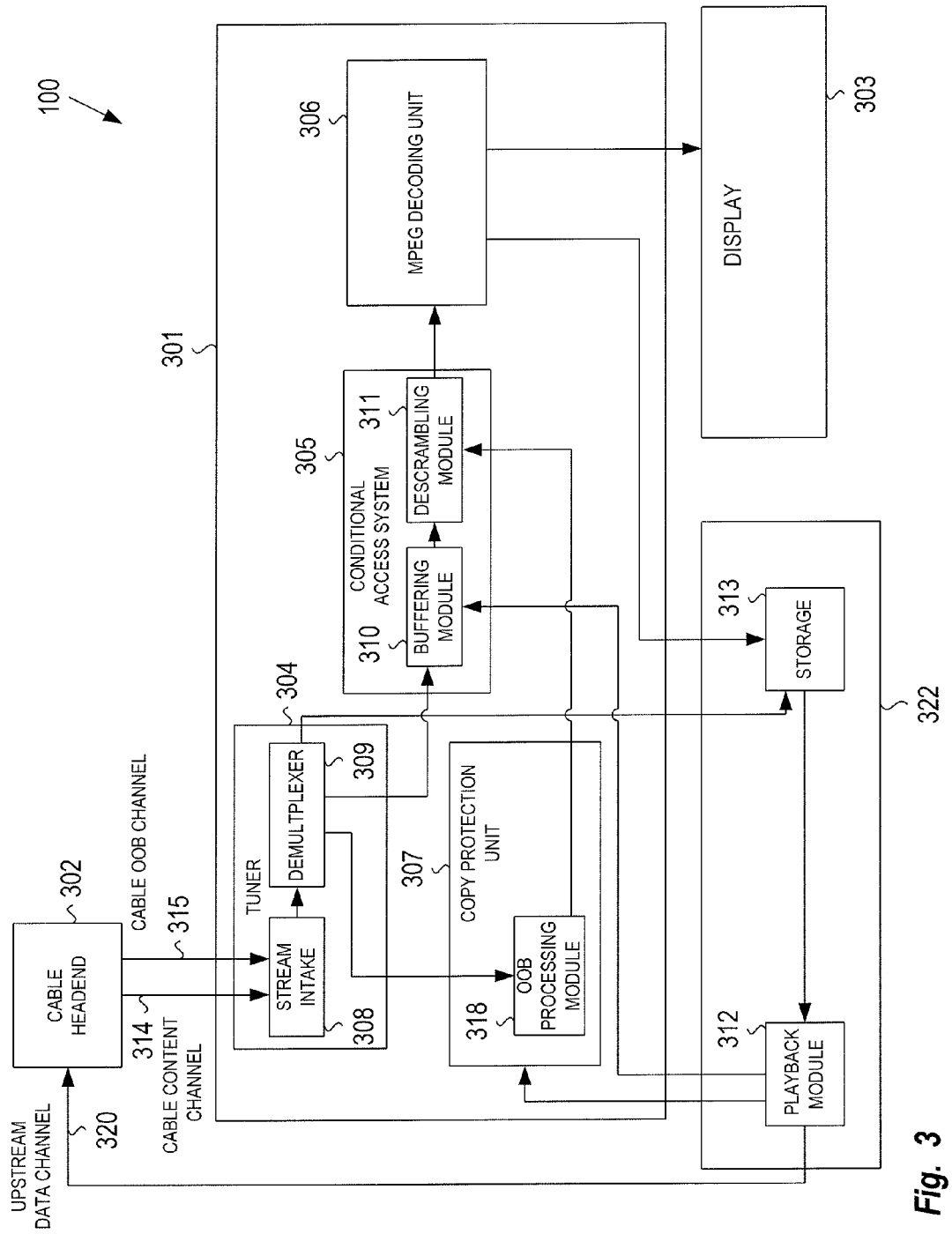
FIG. 3 is a block diagram illustrating the storage and retrieval of encrypted data on a stationary recording device in accordance with the content delivery system of FIG. 7.

FIG. 3 is a block diagram of an embodiment of CDS 100 that permits VOD content that cannot be immediately played back by the STB subscriber 104 to be preloaded. This embodiment includes a cable headend 302 responsible for generation or re-transmission of encrypted content and entitlements. The term headend as used herein is not limited to the terminal facility in the network for receiving television signals for processing and distribution over a cable television system. Rather, headend refers to all facilities used to deliver broadcasted cable content excluding the end-user equipment and transmission medium (e.g., cable, fiber) that is directly connected to the end-user equipment. The headend 302 is capable of transmitting the content and entitlements over the existing broadcast network. In one embodiment the content is transmitted over legacy cable RF infrastructure including a cable content channel 314 and the entitlements are transmitted over an out of band (OOB) channel 315. The headend 302 is also capable of receiving messages from individual set-top boxes over the specifically provided narrowband upstream data channel 320. The upstream data channel 320 can be used for VOD requests as well as for notification that the pre-loaded content is about to be viewed.

In the embodiment of FIG. 3, the CDS 100 further comprises the STB 301, PVR 322 and a display 303. The PVR 322 can be optionally integrated with the STB 301. In one embodiment, the PVR 322 is connected to the STB 301 through an RF cable (not shown).

The STB 301 receives doubly or singly encrypted content from the cable headend 302. The cable content channel 314 and OOB channel 315 transmit cable content data and OOB data (e.g., entitlements), respectively, to the tuner 304 concurrently over the cable connected to the STB 301. In one embodiment, the signal is encoded by the cable provider to be in the MPEG-II form, where pluralities of MPEG-II streams are transmitted over different frequencies on the cable. In one embodiment, the content and the entitlements are delivered over the cable content channel 314. The cable content channel 314 may comprise an RF wire, however optical cable and other delivery mediums know in the art can be used.

The STB 301 processes the signal at the tuner 304. The tuner 304 is capable of singling out the needed channels. The tuner 304 is well understood by those skilled in the art. Once the stream is received at the tuner's stream intake 308 the stream is de-multiplexed by the de-multiplexer 309 and the desired channel is forwarded to the conditional access system 305 to be descrambled. Traditional cable conditional access requires that each encrypted content channel is decrypted with a control word (CW). The CW is normally derived from ECM and EMM messages. The ECM and EMM messages are defined by the international standard ISO IEC 13818-1. However, embodiments are not limited to the traditional ECM/EMM combination, but rather "ECM/EMM" should be understood as ECM/EMM defined by the applicable ISO standard and related encryption technologies. The ECM and EMM messages are delivered over an OOB channel 315 after which they are received by the tuner's stream intake 308 and de-multiplexed by the de-multiplexer 309.

The de-multiplexed ECM/EMM messages are sent to the copy protection unit 307 contained within the STB 301. The copy protection unit 307 processes the OOB data using an OOB processing module 318 and derives the CW from ECM and EMM messages. In one embodiment, the copy protection unit 307 uses a proprietary decryption hardware chip, but other hardware or software technologies can be used to derive the CW. The derived CW is then transferred to the conditional access system 305. Substantially concurrently, de-multiplexed video (e.g., MPEG-II) content stream is also transferred to the conditional access system 305. The conditional access system 305 buffers the content stream using a buffering module 310 to synchronize it with the CW. In one embodiment, the conditional access system 305 receives scrambled MPEG-II packets concurrently with CW to produce a descrambled MPEG-II stream using a descrambling module 311. In one embedment the CW is not immediately derived, instead the ECM is passed to the PVR 322 along with the stream that bypassed the conditional access system 305.

The derived stream is forwarded to MPEG decoding unit 306 which prepares the stream for viewing, and outputs the decoded stream to the display 303. Alternatively the stream can bypass the MPEG decoding unit 306 and be forwarded to the PVR 322. In one embodiment the MPEG stream is encrypted multiple times before being transmitted from the headed end 302. Thus the stream stored on a storage device 313 on the PVR 322 remains encrypted with one layer of encryption. In another embodiment the stream initially bypasses the copy protection unit 307 and is passed to the PVR 322 in encrypted form. The derived stream can also contain one instance of the ECM which is passed along with stream to the PVR 322.

When playback is requested by the user from the PVR 322, the PVR 322 uses the playback module 312 to inform the cable headend 302 that particular content is about to be viewed by particular subscriber. In response, the headend 302 checks if the STB subscriber 104 is authorized to view the content (depending on such factors as timing and the type of subscriber's package) and transmits the second EMM/ECM combination or the needed EMM to the STB 301 over OOB channel 315. In one embodiment, the headend 302 begins broadcasting the second ECM/EMM combination or the needed EMM at a pre-determined time.

Subsequently, the PVR 322 uses the playback module 312 to forward the content stream (e.g., MPEG stream) directly to the conditional access system 305 on the STB 301. In one embodiment the playback module 312 also forwards the stored ECM to the copy protection unit 307. At substantially the same time the STB 301 begins receiving the ECM/EMM messages or the EMM message from the headend 302, that has been notified via an upstream data channel 320 that the playback is about to begin. The ECM/EMM messages or EMM messages are received over OOB channel 315, the channel is tuned by the tuner 304, de-multiplexed by the de-multiplexer 309 and forwarded to the copy protection unit 307. The copy protection unit 307 uses ECM and EMM to create a control word. The conditional access system 305 uses the buffering module 310 to buffer the content stream arriving from the PVR 322 and descrambles it, using a descrambling module 311 and the control word, to create a descrambled content stream. The descrambled stream is forwarded to MPEG decoding unit 306 which prepares the stream to be viewed on a display 303, such as television screen or any device suitable for viewing video. Alternatively the MPEG decoding unit 306 can send the clear stream to the PVR 322.

The CDS 100 can perform more then one method of "On Demand Preloading". In one embodiment, the data is encrypted twice with two sets of CWs, and two sets of ECM/EMM combinations are delivered to the STB 301. In another embodiment, the content is encrypted only once with one CW, but the corresponding ECM and EMM are delivered at different times, and the ECM is stored on the PVR 322 before the EMM is delivered.

Figure 2A:
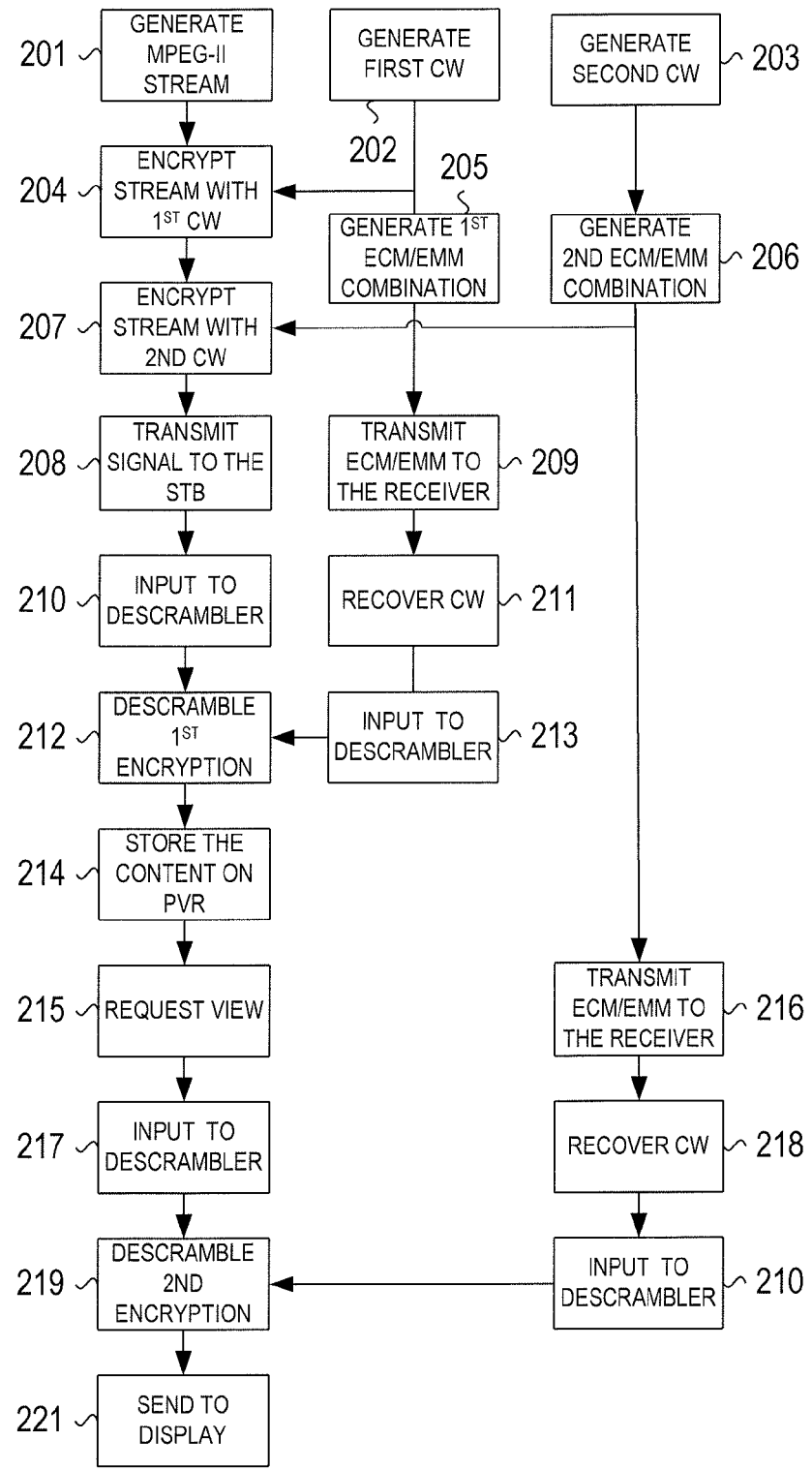
FIG. 2a is a flow diagram illustrating the flow of encrypted information and corresponding keys in accordance with one embodiment of the present disclosure.

FIG. 2a is a flow diagram illustrating the flow of the encrypted information and the corresponding keys associated with the embodiment of FIG. 3. The MPEG encoder located at the headend 302 generates the MPEG-II stream 201. At the same time the headend 302 generates first CW 202 and generates second CW 203. The MPEG stream is consequently encrypted with the first CW 204 and encrypted with the second CW 207. The headend 302 also generates a first ECM/EMM combination 205 corresponding to the first CW and generates the second ECM/EMM combination 206 corresponding to the second CW.

The MPEG stream is subsequently transmitted to the STB 208. The first ECM/EMM combination is transmitted to the receiver simultaneously with the stream 209. The STB 301 uses a copy protection module 307 to recover the first CW 211 from the ECM/EMM combination. The first CW is then inputted into the descrambler 213 and the MPEG stream is also inputted into the descrambler 210. The descrambler proceeds to descramble the encryption 212 and store the content on the PVR 214, since only one round of descrambling took place the data remains encrypted by the second CW.

Once the view is requested 215 by the subscriber, the headend transmits the second set of ECM/EMM messages to the receiver 216. The STB 301 receives the ECM/EMM combination and recovers the second CW 218. The recovered CW is inputted into the descrambler 210. At the same time, the PVR 322 inputs the single-encrypted stored content into the descrambler 217. At this point, the descrambler descrambles the MPEG-II stream 219, the stream is then sent to the display 221 for the subscriber to view.

Figure 4A:
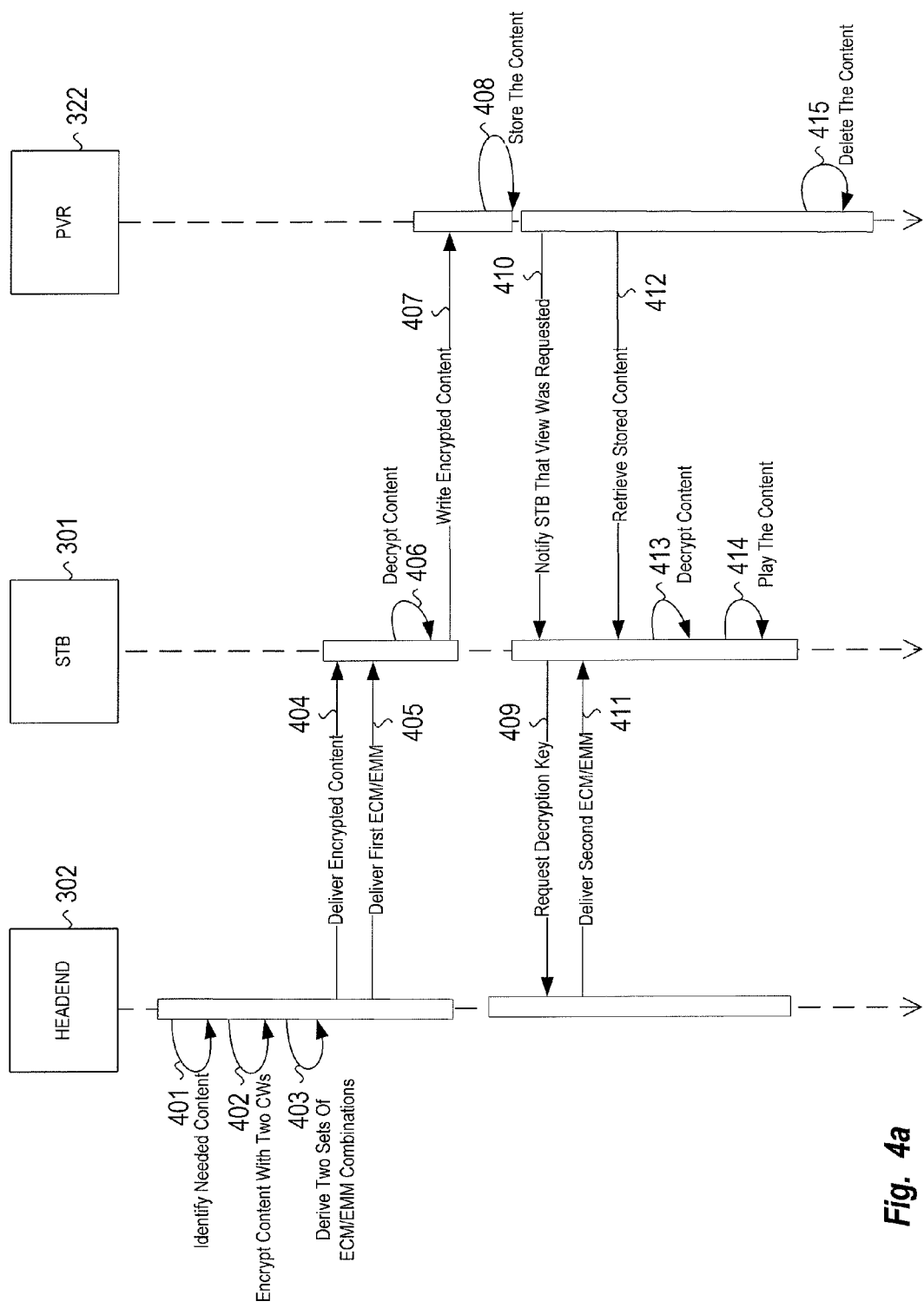
FIG. 4a is a sequence diagram showing the process of delivery of the encrypted information to the stationary recording device in accordance with the content delivery system of FIG. 7.

FIG. 4a is sequence diagram illustrating a method of operation of the system illustrated in FIG. 3 using the flow depicted in FIG. 2a. In operation the system allows the headend 302 to preload high-demand material to the PVR 322 during off-peak viewing hours. Subsequently, when viewing is requested, the content can be played from the PVR 322 with the entitlements provided simultaneously by the headend 302.

In one embodiment, the headend identifies the needed content 401 ahead of time. For example, the headend can identify popular "new-release" movies expected to be in the highest demand by the subscriber upon release. The headend 302 can also identify other VOD content that is expected to be in particularly high demand. In one embodiment, the desired content is identified and distributed to the subscribers before the content is made available for viewing. This is possible since the content stored on the PVR 322 is encrypted and unplayable until the headend releases an appropriate decryption messages.

Once the content is identified 401, the headend encrypts the content with two sets of CW 402. The headend also derives two sets of ECM/EMM messages 403 corresponding to the two CWs. Subsequently, the headend 302 delivers the encrypted content 404 and the first set of ECM/EMM messages 405 to the STB 301.

The STB 301 uses the first ECM/EMM combination to remove the first layer of encryption from the content 406. The produced content is written 407 from the STB 301 to the PVR 322. The PVR 322 stores the content 408 until the view is requested by the subscriber. Once the PVR 322 receives the subscriber's direction to play back the content, the PVR 322 notifies the STB 301 of the request 410. The STB 301 subsequently requests the decryption key 409 from the headend 302. In response, the headend 302 delivers the second ECM/EMM combination 411. At the same time the STB 301 receives the stored content 412 from the PVR 322, and decrypts the content using the received key 413. The content is played back concurrently with decryption 414. After a certain time passes, or after a specific request by the subscriber or by the headend 301 the content may be deleted 415 by the PVR 322.

Figure 2B:
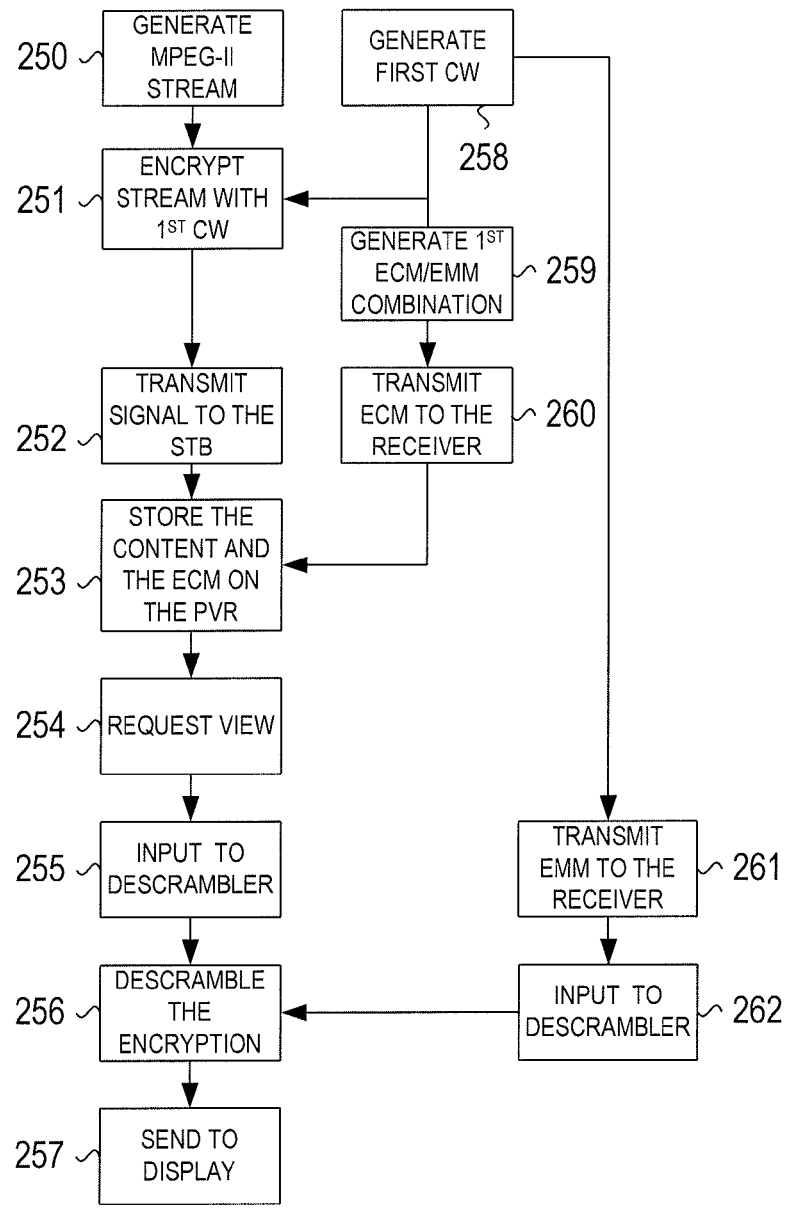
FIG. 2b is a flow diagram illustrating the flow of encrypted information and corresponding keys in accordance with another embodiment of the present disclosure.

FIG. 2b is a flow diagram illustrating an alternative flow of the encrypted information and the corresponding keys associated with the embodiment of FIG. 3. In this embodiment only one CW is needed. The MPEG encoder located at the headend 302 generates the descrambled MPEG-II stream 250. At the same time the headend 302 generates the first CW 258. The MPEG stream is consequently encrypted with the first CW 204. The headend 302 also generates the first ECM/EMM combination corresponding to the CW 259.

The MPEG-II stream is subsequently transmitted 252 to the STB 301. The ECM is transmitted to the river 260 substantially simultaneously with the stream. The STB 301 stores the content and the ECM 253 using a PVR 322.

Once the view is requested 254 by the subscriber, the headend transmits EMM 261 to the STB. The EMM is inputted into the descrambling module 262. At substantially the same time, the PVR 322 inputs the single-encrypted stored content and the stored ECM into the descrambler 255. At this point, the descrambler descrambled the MPEG-II stream 256 which can be sent to a display 257 for the subscriber to view.

Figure 4B:
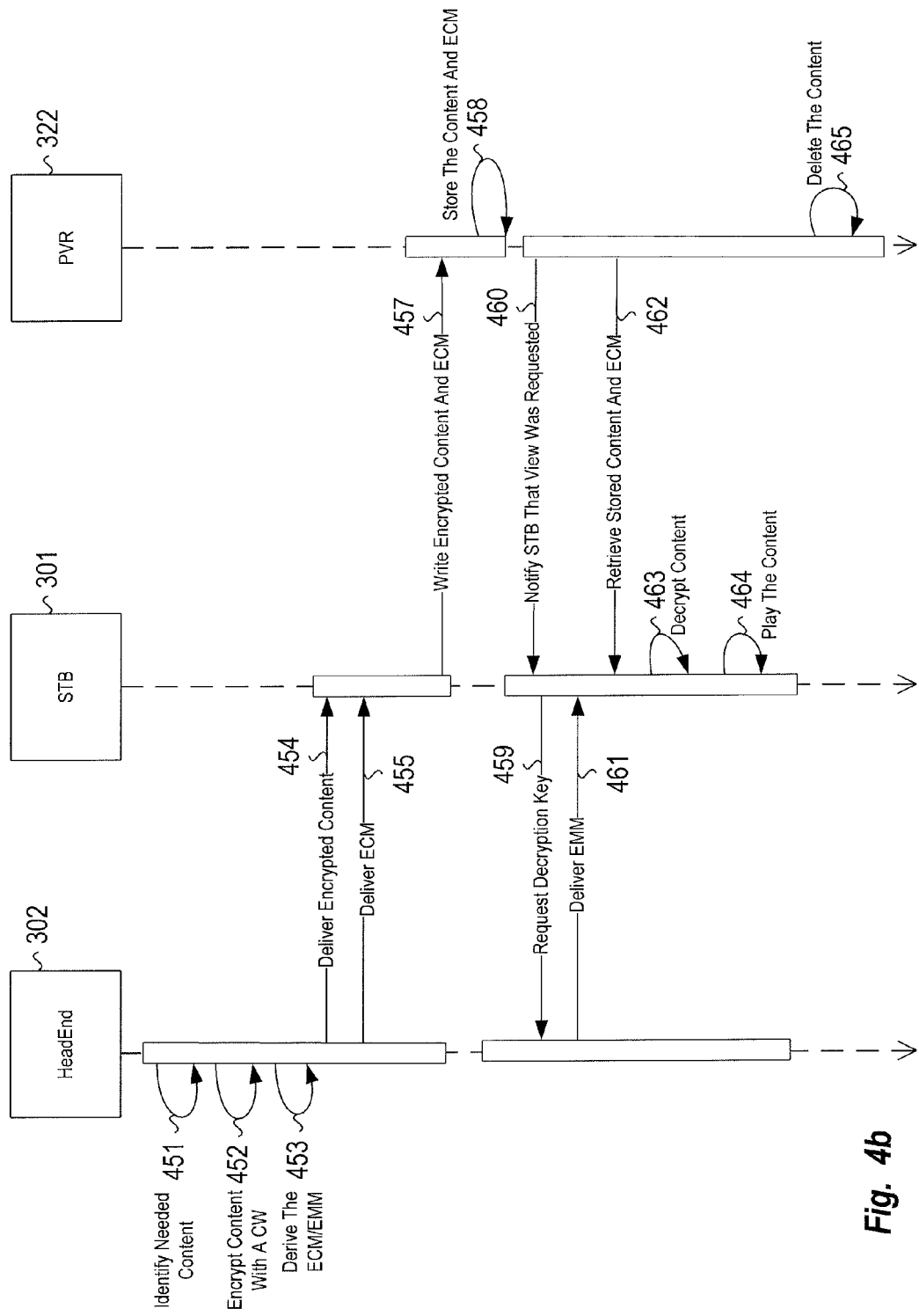
FIG. 4b is a sequence diagram showing the process of delivery of the encrypted information to the stationary recording device in accordance with the content delivery system of FIG. 7.

FIG. 4b is sequence diagram illustrating a method of operation of another embodiment of the system illustrated in FIG. 3 that allows for preloading of the content that was only encrypted once. In operation the system allows the headend 302 to preload high-demand material and a partial decryption key to the PVR 322 during off-peak viewing hours. Subsequently, when viewing is requested, the content can be played from the PVR 322 with the remaining entitlements provided simultaneously by the headend 302.

Once the content is identified 451, the headend proceeds to encrypt the content with one CW 452. The headend derives a set of ECM/EMM messages 453 corresponding to the CW. Subsequently, the headend 302 delivers the encrypted content 454 and the ECM messages 455 to the STB 301.

The produced content and ECM are written 457 from the STB 301 to the PVR 322. The PVR 322 stores the content and ECM 458 until the view is requested by the subscriber. Once the PVR 322 receives the subscriber's direction to play back the content, the PVR 322 notifies the STB 301 of the request 460. The STB 301 subsequently requests the remaining part of decryption key 459 from the headend 302. The headend 302 proceeds to deliver the EMM 461, if appropriate. At the same time the STB 301 receives the stored content and the stored ECM 462 from the PVR 322, and proceeds to decrypt the content 463 using the ECM/EMM combination. The content is played back 464 concurrently with decryption 463. After a certain time passes, or after a specific request by the subscriber or by the headend 301 the content may be deleted 465 by the PVR 322.

Figure 5:
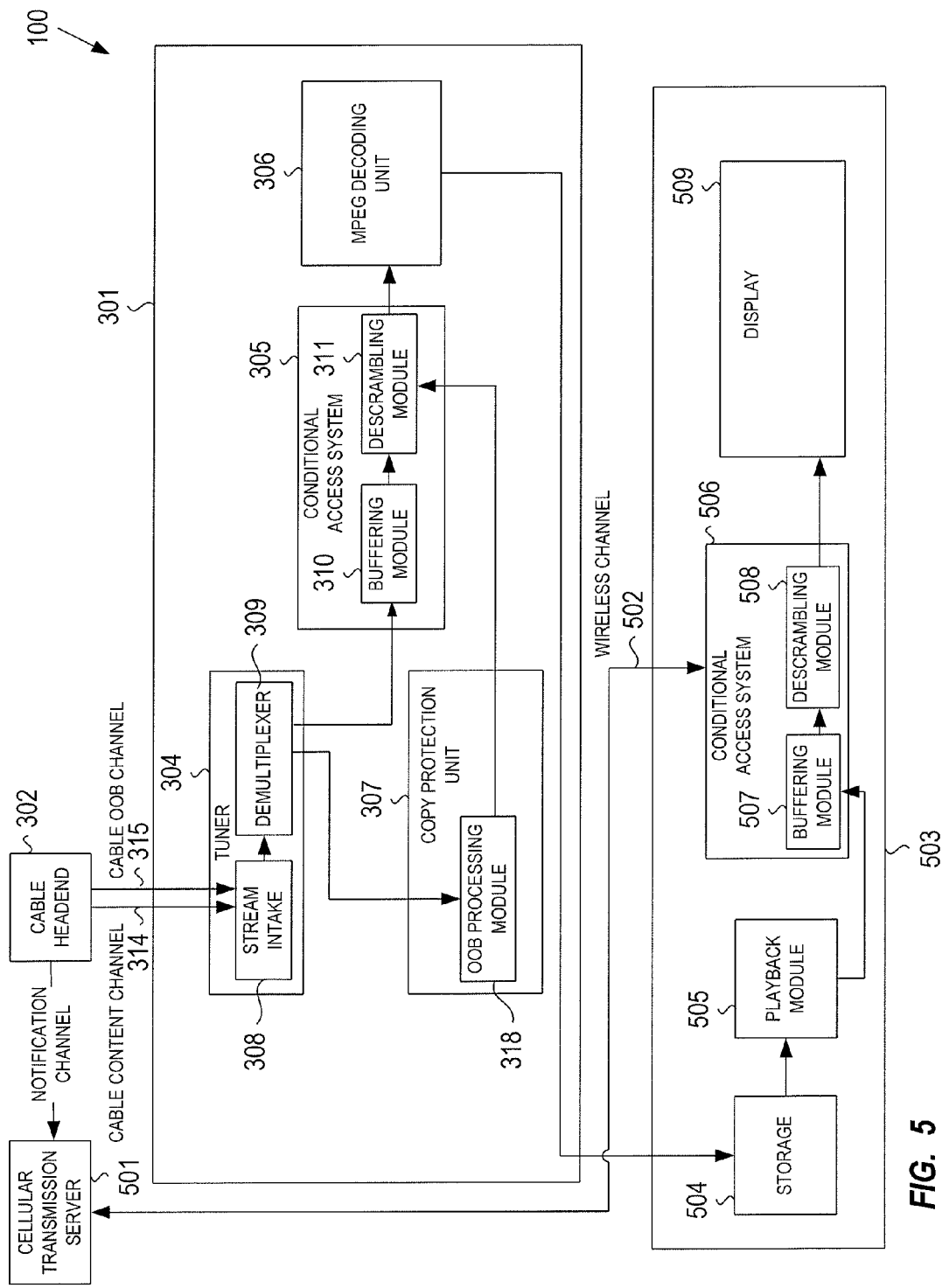
FIG. 5 is a block diagram illustrating the storage and retrieval of the encrypted data on a mobile recording device in accordance with the content distribution system of FIG. 7.

FIG. 5 is a block diagram of an alternative embodiment of the CDS 100 that permits content to be preloaded on a mobile PVR 503 with a subsequent wireless delivery of the decryption information. For example, the subscriber can use the system to request and preload popular shows not yet released for viewing, receive that show in the scrambled form, and receive the descrambling key later, via a wireless channel. In FIG. 5, the cable headend 302 has access to a cellular transmission server 501 which has access to a wireless infrastructure, including but not limited to EDGE, GSM or 3G networks.

The system also includes the STB 301 of mobile STB subscriber 104, and a mobile PVR 503. In this embodiment the mobile PVR 503 is connected to the STB 301 through a cable suitable for providing content (e.g., an RF cable). The content and entitlements are received by the STB 301 at the tuner 304. The tuner 304 receives the stream at the stream intake 308 and de-multiplexes the content using demultiplexer 309. The de-multiplexed channel stream is forwarded to the conditional access system 305. At the same time the tuner 304 forwards the content of de-multiplexed OOB channel to the copy protection unit 307 which processes the OOB channel information at the OOB processing module 318 and derives the CW. The CW is forwarded to the conditional access system 305.

The conditional access system 305 buffers the content stream using the buffering module 310 and descrambles the stream using the descrambling module 311 and the CW to create a descrambled MPEG-II stream. The descrambled stream is still encrypted by the second CW. The streamed MPEG is then decoded by the MPEG decoding unit 306 and forwarded to the mobile PVR 503 which is communicating with the STB 301.

The content stream is received, processed, and stored in the storage 504 by the Mobile PVR 503. At this point the Mobile PVR 503 may be disconnected from the STB 301. The subscriber however is incapable of immediately playing back the content at this point because the stored content remains encrypted. When the content becomes available to general public, or at another pre-defined time, the cable headend 302 authorizes the subscriber's to view the content. The cable headend 302 then notifies the cellular transmission server 501 that content playback is authorized. The cellular transmission server 501 forwards the CW to the Mobile PVR 503 using a wireless channel 502. In another embodiment the CW is only transmitted when the cellular transmission sever 501 receives a request from the mobile PVR 503.

Once the subscriber requests playback of the pre-stored content using the playback module 505 and the mobile PVR 503 receives the CW over a wireless channel 502, the final descrambling can take place. The mobile PVR 503 includes a conditional access system 506 capable of buffering stored content at the buffering module 507 and descrambling each frame using the descrambling module 508 with the CW received over the wireless network. The descrambled frames are played-back on the display 509. In one embodiment the display 509 is a built-in display of the mobile PVR 503.

Figure 6:
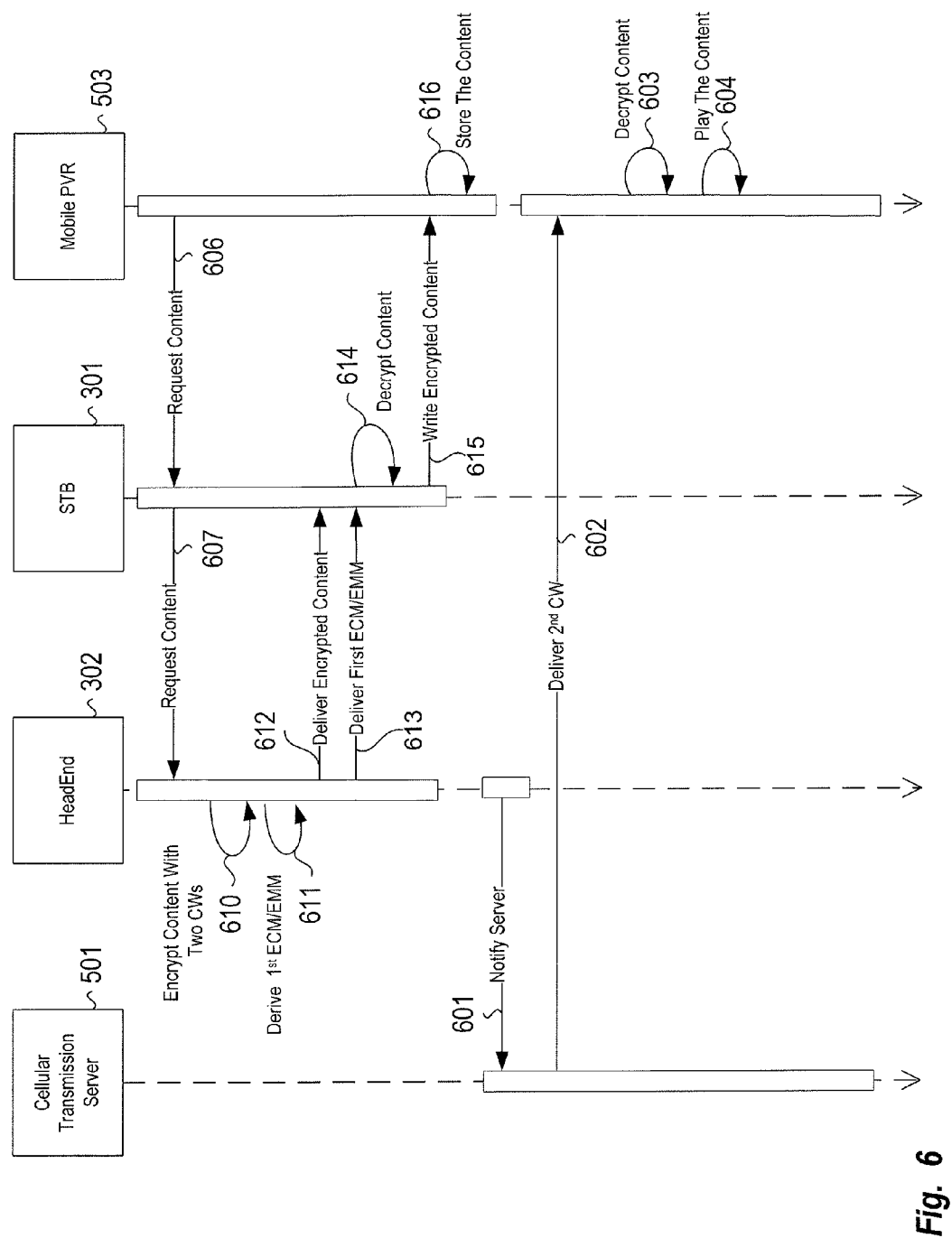
FIG. 6 is a sequence diagram showing the process of delivery of the encrypted information to the mobile recording device in accordance with the content delivery system of FIG. 7.

FIG. 6 is sequence diagram demonstrating a method of operation of the CDS 100 in the embodiment shown in FIG. 5. In this implementation, the subscriber attaches the mobile PVR 503 to the STB 301 and uses the mobile PVR 503 to request the content 606 he wants to watch later when he will not have access to the STB 301. Alternatively, the subscriber can use the STB 301 to request content. The mobile PVR 503 can also be connected to STB 301 wirelessly. The STB 301 in turn requests the content 607 from the headend 302. In one embodiment, the request can be sent via up-stream channel of a RF-cable. If the requested content is available for preloading, the headend 302 encrypts the requested content with two sets of CWs 610. A set of ECM/EMM messages is then derived from the first CW 611.

The encrypted content 612 and the first ECM/EMM combination 613 are then delivered from the headend 302 to the STB 301. The STB 301 then uses the ECM/EMM to decrypt the delivered content 614 and forwards the decrypted content 615 to the attached mobile PVR 503. The incoming content stream is then stored 616 at the mobile PVR 503. The subscriber can now disconnect the mobile PVR 503 from the STB 301. However, the subscriber is still incapable of playing the content because the content remains encrypted by the second CW.

The second CW is automatically delivered by a push mechanism to the subscriber's mobile PVR 503. The technology for delivering data to a mobile device via a "push mechanism" is well known and understood by one skilled in the art. When the content becomes available for viewing (for example when a network show begins broadcasting normally at the scheduled time) the headend 302 notifies 601 the Mobile Network Server 501 that the second CW can be released. Optionally the CW is transferred from the headend 302 to the mobile network server during this step. Next, the mobile network server 501 delivers 602 the end CW to the Mobile PVR 503 which has previously pre-loaded the content. The mobile PVR 503 uses the CW to decrypt the content 603 and output the descrambled video for viewing 604. In one embodiment, the mobile PVR 503 stores the CW and can use it to decrypt the content at any subsequent time. In another embodiment, the CW is not stored at the mobile PVR but discarded immediately after use. In another implementation the CW is not pushed to mobile PVR 503 as soon as it becomes available, it is only downloaded when the subscriber requests to view the content. In a further embodiment, the content may be deleted from the PVR by a request from the user or automatically after a certain time.

The network 700 may be any network or system generally known in the art, including the Internet, an intranet, a local area network (LAN), a wide area network (WAN), a metropolitan area network (MAN), a direct connection or series of connections, a cable television infrastructure, a cellular telephone network or any other network, transmission channel or medium capable of facilitating communication between the devices, modules and other components of the content delivery system 100. The network may be wired, wireless or a combination thereof. Wired connections may be implemented using Ethernet, Universal Serial Bus (USB), RJ-11 or any other wired connection generally known in the art. Wireless connections may be implemented using wife, wimax, bluetooth, infrared, cellular networks, satellite or any other wireless connection methodology generally known in the art. The network maybe implemented in a client-server, token-ring, peer-to-peer manner or any other network topology known in the art. Additionally, several networks may work alone or in communication with each other to facilitate communication in the network 700. Various networking standards may be employed for allowing the content delivery system 100 to communicate with the network 700, such as EDGE, 3G and/or 802.11.

Figure 8:
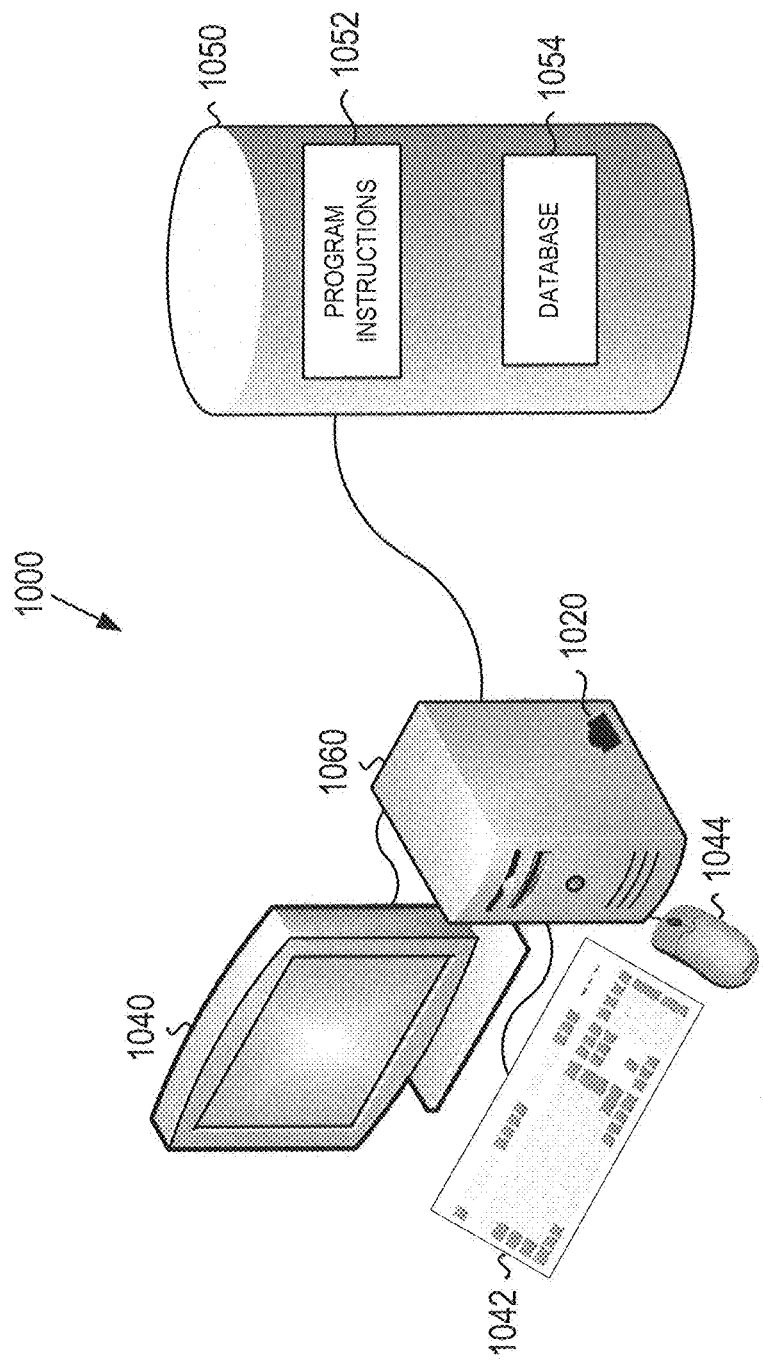
FIG. 8 is a block diagram of a computer system for realization of the content delivery system of FIG. 7.

FIG. 8 is a block diagram illustrating a computer system 1000 for realization of a computer-implemented apparatus that may form all or a portion of one or more implementation(s) or embodiment(s) of the present disclosure. The computer system 1000 includes a computer 1060, a keyboard 1042, a mouse 1044, and a display device (e.g., computer monitor) 1040 through which the computer 1060 may receive input/provide output, for example to a user, operator or another computer or system (not shown). Input/output devices such as the display device 1040, keyboard 1042, the mouse 1044, and other means or mechanisms (e.g., touch screen interface) through which interaction with the computer system 1000 may occur are generally known in the art, and a detailed discussion thereof is omitted here for convenience only and should not be considered limiting. The computer 1060 includes a network port 1020 for connecting the computer to an internal or external network, such as, for example the network 700. The computer 1060 is connected to a storage device 1050 that includes program instructions 1052 for software application(s) that provides the logical functions of the computer-implemented apparatus and/or method(s) of the present disclosure. The storage device 1050 also contains a database 1054 for storing data.

Those skilled in the art will recognize that the program instructions 1052 for software applications implementing all or a portion of one or more embodiment(s) of the present disclosure may be written in a programming language such as Java or C++, and that the database 1054 may be implemented with a database package such as Microsoft Access™ or a database management system (DBMS) such as Microsoft SQL Server™, Microsoft SQL Server CE™, IBM DB2™, mySQL or postgreSQL.

Figure 9:
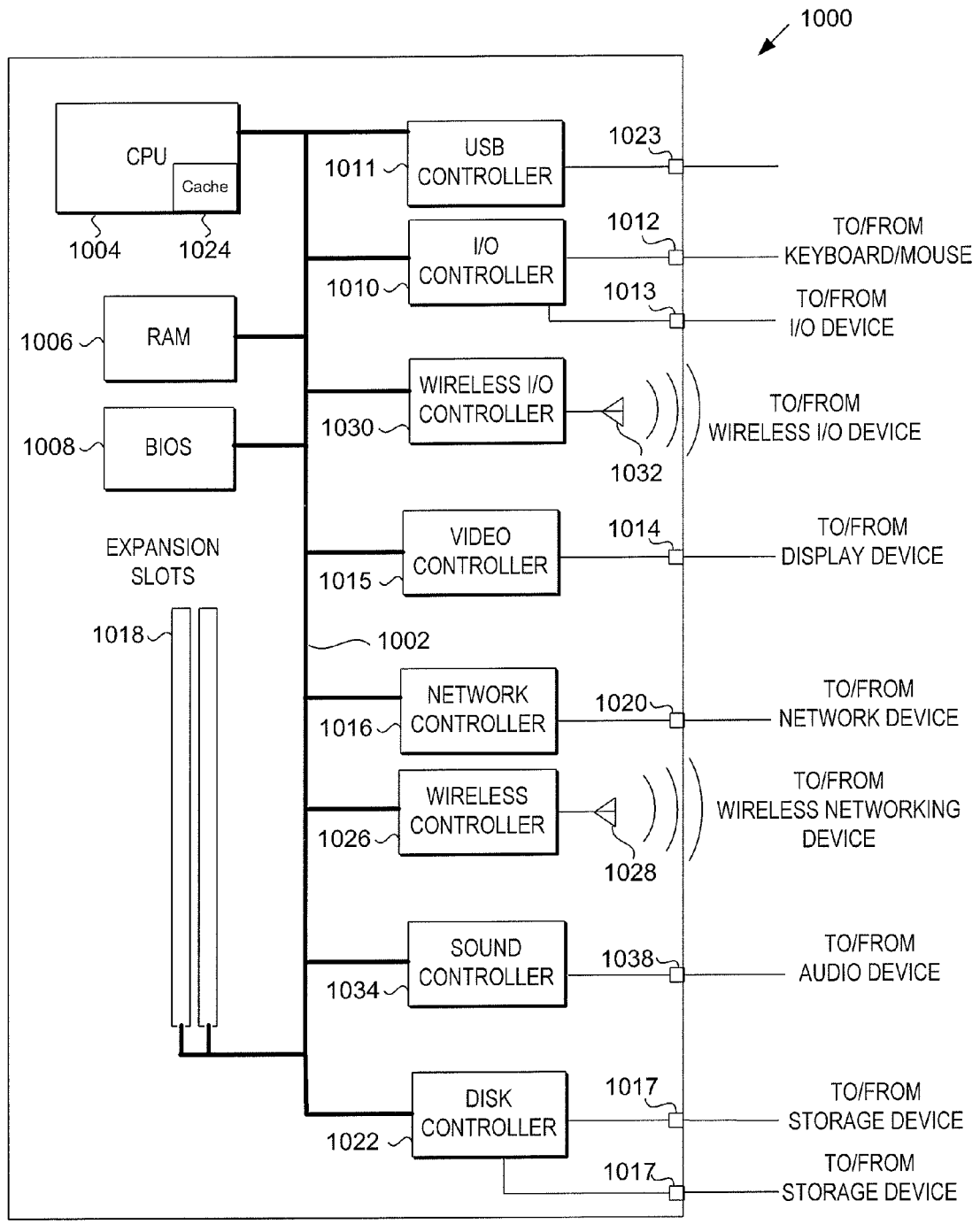
FIG. 9 is a block diagram of a computer system for realization of the content delivery system of FIG. 7.

FIG. 9 is a block diagram illustrating a computer architecture of the system 1000 through which the embodiments of the content delivery system 100. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive (HDD), optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and/or pointing device (e.g., mouse, touch pad) (see FIG. 8) can be connected to the keyboard/mouse port(s) 1012, and other I/O devices could be connected to additional I/O port(s) 1013, which are connected to the system bus 1002 through the I/O controller 1005. Additional ports or devices, such as serial ports, parallel ports, firewire adapters, or biometric devices (not shown), may be utilized through the I/O controller 1010. A display device (see FIG. 8) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and/or an internal or external battery. These devices are generally well-know to those skilled in the art, and a detailed discussion thereof is omitted here for convenience only and should not be considered limiting.

The embodiments of the present disclosure may be implemented with any combination of hardware and software. If implemented as a computer-implemented apparatus, the present disclosure is implemented using means for performing all of the steps and functions described above.

The embodiments of the present disclosure can be included in an article of manufacture (e.g., one or more computer program products) having, for instance, computer useable or computer readable media. The media has embodied therein, for instance, computer readable program code means, including computer-executable instructions, for providing and facilitating the mechanisms of the embodiments of the present disclosure. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present disclosure is not limited to the particular examples and implementations disclosed herein, but is intended to cover modifications within the spirit and scope thereof as defined by the appended claims and any and all equivalents thereof.

We claim:

1. A method of providing conditional access to video content, the video content being encrypted by a second layer of encryption resulting in singly encrypted video content and the singly encrypted video content encrypted by a first layer of encryption resulting in multiply encrypted video, the method comprising:
   (a) receiving the multiply encrypted video content over a broadcast network by a subscriber's set top box without a user request;
   (b) receiving first decryption data with the multiply encrypted video content by the subscriber's set top box;
   (c) applying the first decryption data to the multiply encrypted video content by the subscriber's set top box to remove the first layer of encryption from the multiply encrypted video content to retrieve the singly encrypted video content;
   (d) preloading the subscriber's set top box with the singly encrypted video content for access at a later time;
   (e) transmitting a user request for viewing of the singly encrypted video content over the broadcast network from the subscriber's set top box;
   (f) receiving second decryption data over the broadcast network by the subscriber's set to box in response to the user request; and
   (g) applying the second decryption data to the stored singly encrypted video content by the subscriber's set top box to remove the second layer of encryption to retrieve the video content.

2. The method of claim 1, wherein the first decryption data is a first Entitlement Control Message/Entitlement Management Message (ECM/EMM) combination and the second decryption data is a second ECM/EMM combination.

3. The method of claim 1, wherein the broadcast network is one or more of a cable television network, a wireless network, Internet, an intranet, a local area network ("LAN"), a wide area network ("WAN"), a metropolitan area network ("MAN"), a Wi-Fi network and a cellular telephone network.

4. The method of claim 1, wherein the singly encrypted video content is stored on a personal video recorder.

5. A method of providing conditional access to video content, the video content being encrypted by an inner layer of encryption resulting in singly encrypted video content and the singly encrypted video content encrypted by an outer layer of encryption resulting in multiply encrypted video content, the method comprising:
   (a) receiving the multiply encrypted video content over a broadcast network by a set top box;
   (b) receiving a first portion of decryption data with the multiply encrypted video content by the set top box;
   (c) storing the multiply encrypted video content in the set top box;
   (d) storing the first portion of the decryption data in the set top box;
   (e) transmitting a user request for viewing of the video content from the set top box;
   (f) receiving, a second portion of the decryption data over the broadcast network by the set top box;
   (g) applying the first portion of decryption data to the multiply encrypted video content to remove the outer layer of encryption from the multiply encrypted video content to retrieve the singly encrypted video content by the set top box; and
   (h) applying the second portion of decryption data to the singly encrypted video content to remove the inner layer of encryption from the singly encrypted video content to retrieve the video content by the set top box.

6. The method of claim 5, wherein the first portion of decryption data is an ECM and the second portion of the decryption data is an EMM.

7. The method of claim 5, wherein the broadcast network is a cable television network, the multiply encrypted video content is received by the set top box, and the encrypted video content and the first portion of the decryption data are stored on a personal video recorder.

8. The method of claim 5, wherein the multiply encrypted video content has not been requested by a subscriber.

9. A method for conditional access to video content, the video content being encrypted by a second layer of encryption resulting in singly encrypted video content and the singly encrypted video content encrypted by a first layer of encryption resulting in multiply encrypted video content, the method comprising:
   (a) receiving the multiply encrypted video content over a cable television network by the set top box;
   (b) receiving first decryption data with the multiply encrypted video content by the set top box;
   (c) applying the first decryption data to the multiply encrypted video content to remove the first layer of encryption from the multiply encrypted video content to retrieve the singly encrypted video content by the set top box;
   (d) storing the singly encrypted video content on a mobile personal video recorder;
   (e) transmitting an user re nest to view the singly encrypted video content over a wireless network by the mobile personal video recorder;
   (f) receiving, second decryption data over the wireless network by the mobile personal video recorder; and
   (g) applying the second decryption data to the singly encrypted video content to remove the second layer of encryption from the singly encrypted video content to retrieve the video content, by the mobile video recorder.

10. The method of claim 9, wherein the first decryption data is a first ECM/EMM combination and the second decryption data is a second ECM/EMM combination different from the first ECM/EMM combination.

11. The method of claim 9, wherein the wireless network is at least one of a WiFi network and a cellular network.

12. The method of claim 9, wherein the second decryption data is at least one of an RSA key and a DES key.

13. The method of claim 9, wherein the multiply encrypted video content is unsolicited.

14. The method of claim 9, wherein the second decryption data is unsolicited.

15. A method for requesting video content that is to be subsequently viewed at a viewing time, the video content being encrypted by a second layer of encryption resulting in singly encrypted video content and the singly encrypted video content encrypted by a first layer of encryption resulting in multiply encrypted video content, the method comprising:
  (a) requesting the video content from a cable set top box;
  (b) receiving the multiply encrypted video content over a cable television network by the cable set top box;
  (c) receiving first decryption data with the multiply encrypted video content by the cable set top box;
  (d) applying the first decryption data to retrieve the singly encrypted video content by the cable set top box;
  (e) storing the singly encrypted video content on a PVR;
  (f) at the viewing time, transmitting a request for viewing of the video content from the PVR;
  (g) receiving second decryption data over the broadcast network in response to the request by the PVR; and
  (h) applying the second decryption data to the stored singly encrypted video content to retrieve the video content by the PVR.

16. The method in claim 15, wherein the first decryption data is a first ECM/EMM combination and the second decryption data is a second ECM/EMM combination.

17. A method for providing conditional access to video content, the video content being encrypted by a second layer of encryption resulting in singly encrypted video content and the singly encrypted video content encrypted by a first layer of encryption resulting in multiply encrypted video content, the method comprising:
  (a) receiving the multiply encrypted video content over a cable television network by a cable set top box;
  (b) storing the multiply encrypted video content on a PVR;
  (c) transmitting a request for viewing of the video content over a broadcast network different from the cable television network by the PVR;
  (d) receiving first decryption data and second decryption data over the different broadcast network;
  (e) applying the first decryption data to remove the first layer of encryption from the encrypted video content to retrieve the singly encrypted video content by the PVR; and
  (f) applying the second decryption data to the singly encrypted video content to remove the second layer of encryption to retrieve the video content by the PVR.

18. The method in claim 17, wherein the decryption data is an ECM/EMM combination.

19. The method in claim 17, where the request for viewing of the multiply encrypted video is a request for video on demand programming.

20. The method of claim 17, wherein the multiply encrypted video content has not been requested by a subscriber.

* * * * *